(12) United States Patent
Kim et al.

(10) Patent No.: US 9,401,652 B2
(45) Date of Patent: Jul. 26, 2016

(54) PRIMARY SIDE REGULATOR

(71) Applicant: FAIRCHILD KOREA SEMICONDUCTOR LTD., Bucheon-si (KR)

(72) Inventors: Taesung Kim, Yeongtong-gu (KR); Seung-Uk Yang, Dongan-gu (KR); Youngbae Park, Bucheon-si (KR)

(73) Assignee: Fairchild Korea Semiconductor LTD (KR)

( * ) Notice: Subject to any disclaimer, the term of this patent is extended or adjusted under 35 U.S.C. 154(b) by 91 days.

(21) Appl. No.: 14/446,273

(22) Filed: Jul. 29, 2014

(65) Prior Publication Data

US 2015/0036392 A1 Feb. 5, 2015

Related U.S. Application Data

(60) Provisional application No. 61/860,488, filed on Jul. 31, 2013.

(30) Foreign Application Priority Data

Jul. 3, 2014 (KR) .......................... 10-2014-0083322

(51) Int. Cl.
| | |
|---|---|
| *H02M 1/08* | (2006.01) |
| *H02M 1/42* | (2007.01) |
| *H02M 3/335* | (2006.01) |
| *H02M 1/00* | (2006.01) |

(52) U.S. Cl.
CPC ........ *H02M 3/33523* (2013.01); *H02M 1/4258* (2013.01); *H02M 2001/0009* (2013.01); *H02M 2001/0025* (2013.01); *Y02B 70/126* (2013.01)

(58) Field of Classification Search
CPC ...... H02M 3/33515; H02M 1/42; H02M 1/08
See application file for complete search history.

(56) References Cited

U.S. PATENT DOCUMENTS

| | | | | |
|---|---|---|---|---|
| 6,359,715 | B1* | 3/2002 | Imajo | H04B 10/6931 250/214 A |
| 6,984,963 | B2* | 1/2006 | Pidutti | H02M 1/4225 323/207 |
| 7,525,259 | B2* | 4/2009 | Weirich | H02M 3/33523 315/224 |
| 2010/0208500 | A1* | 8/2010 | Yan | H02M 3/33523 363/21.12 |
| 2010/0302815 | A1 | 12/2010 | Li et al. | |
| 2011/0261596 | A1* | 10/2011 | Zong | H02M 3/33507 363/21.13 |
| 2011/0286248 | A1* | 11/2011 | Wang | H02M 3/33507 363/21.18 |
| 2012/0075891 | A1* | 3/2012 | Zhang | H02M 3/335 363/21.18 |
| 2012/0243269 | A1 | 9/2012 | Ren et al. | |
| 2012/0250378 | A1 | 10/2012 | Kok et al. | |
| 2013/0294118 | A1* | 11/2013 | So | H02M 3/33507 363/21.16 |
| 2013/0308350 | A1* | 11/2013 | Huang | H02M 3/33523 363/21.16 |
| 2014/0225532 | A1 | 8/2014 | Groeneveld | |

FOREIGN PATENT DOCUMENTS

EP 2765697 8/2014

* cited by examiner

*Primary Examiner* — Emily P Pham
(74) *Attorney, Agent, or Firm* — Grossman Tucker Perreault & Pfleger PLLC

(57) ABSTRACT

A primary side regulator according to an embodiment includes a power switch connected to a primary winding, a secondary winding configured to be insulated and coupled to the primary winding, a diode connected between the secondary winding and an output terminal, and an auxiliary winding coupled to the primary winding, and insulated and coupled to the secondary winding. The primary side regulator controls a switching operation of the power switch using a voltage obtained by filtering at least one of an estimation voltage signal corresponding to an output voltage of the output terminal and an estimation current signal corresponding to an output current flowing through the diode.

20 Claims, 4 Drawing Sheets

PRIMARY SIDE REGULATOR

CROSS-REFERENCE TO RELATED APPLICATION

This application claims priority to and the benefit of U.S. Patent Application No. 61/860,488 filed in the USPTO on Jul. 31, 2013, and the priority and benefit of Korean Patent Application No. 10-2014-0083322 filed in the Korean Intellectual Property Office on Jul. 3, 2014, the entire contents of which are incorporated herein by reference.

BACKGROUND

1. Field

Embodiments of the invention relate to a primary side regulator.

2. Description of the Related Art

In power factor correction, an output voltage has a large ripple with respect to a frequency of a line input voltage. Since the line input voltage is a voltage in which an alternating current input is rectified, and a diode current is a function of the square of the line input voltage, the diode current is a sine squared function. An inductor current is rectified through a diode, and the rectified current is referred to as the diode current.

A primary side regulator for regulating an output current and an output voltage estimates a diode current and the output voltage. At this time, a large current ripple may be included in an output current estimation result since the square of the ripple of the line input voltage has an influence on the output current estimation. Further, the ripple of the line input voltage may also have an influence on the output voltage estimation, and thus the large voltage ripple may be included in the output voltage estimation result.

Therefore, there is a problem in that an output of an error amplifier has a large voltage ripple due to the ripple of the estimated output voltage, and a duty ratio is not constant even during one period of the line input voltage. This causes a low power factor. Further, constant current (CC) performance is decreased and a kick-in and kick-out phenomenon occurs due to the ripple of the estimated output current.

SUMMARY OF THE INVENTION

The invention is directed to a primary side regulator which can improve estimation accuracy of an output voltage and an output current.

According to an aspect of the invention, there is provided a primary side regulator, including: a power switch connected to a primary winding; a secondary winding configured to be insulated and coupled to the primary winding; a diode connected between the secondary winding and an output terminal; and an auxiliary winding coupled to the primary winding, and insulated and coupled to the secondary winding. The primary side regulator may control a switching operation of the power switch using a voltage obtained by filtering at least one of an estimation voltage signal corresponding to an output voltage of the output terminal and an estimation current signal corresponding to an output current flowing through the diode.

The primary side regulator may further include: a peak detector configured to detect a peak voltage of a first sensing voltage according to a current flowing through the power switch for each switching period of the power switch; and a current calculator configured to generate the estimation current signal by multiplying the peak voltage, the switching period of the power switch, and an "on" signal corresponding to a "turn-on" period of the diode.

The primary side regulator may further include: a sample and hold unit configured to sample and hold a second sensing voltage according to an auxiliary voltage of the auxiliary winding at a time at which a current does not flow through the diode after the power switch is turned "off", and generate the estimation voltage signal.

The primary side regulator may further include: a first filter configured to perform a low pass filtering operation on the estimation current signal, and generate a current average. The primary side regulator may further include: a first error amplifier configured to amplify a difference between the current average and a predetermined first reference voltage, and generate a current average error.

The primary side regulator may further include: a digital filter configured to convert the estimation current signal into a digital signal, calculate an average value of the digital signal, convert the calculated average value into an analog signal, and generate a current average.

The primary side regulator may further include: a second filter configured to perform a low pass filtering operation on the estimation voltage signal, and generate a voltage average. The primary side regulator may further include: a second error amplifier configured to amplify a difference between the voltage average and a predetermined second reference voltage, and generate a voltage average error.

The primary side regulator may further include: a digital filter configured to convert the estimation voltage signal into a digital signal, calculate an average value of the digital signal, convert the calculated average value into an analog signal, and generate a voltage average.

The primary side regulator may generate a current average by performing a low pass filtering operation on the estimation current signal and a current average error by amplifying a difference between the current average and a predetermined first reference voltage, generate a voltage average by performing a low pass filtering operation on the estimation voltage signal and a voltage average error by amplifying a difference between the voltage average and a predetermined second reference voltage, and turn the power switch off when a current flowing through the power switch reaches at least one of the current average error and the voltage average error.

The primary side regulator may generate a current average by performing a low pass filtering operation on the estimation current signal and a current average error by amplifying a difference between the current average and a predetermined first reference voltage, generate a voltage average error by amplifying a difference between the estimation voltage signal and a predetermined second reference voltage, and turn the power switch off when a current flowing through the power switch reaches at least one of the current average error and the voltage average error.

The primary side regulator may generate a current average error by amplifying a difference between the estimation current signal and a predetermined first reference voltage, generate a voltage average by performing a low pass filtering operation on the estimation voltage signal and a voltage average error by amplifying a difference between the voltage average and a predetermined second reference voltage, and turn the power switch off when a current flowing through the power switch reaches at least one of the current average error and the voltage average error.

The primary side regulator may calculate a digital current average value by converting the estimation current signal into a digital signal, generate a current average by converting the calculated digital current average value into an analog signal, and generate a current average error by amplifying a difference between the current average and a predetermined first reference voltage, calculate a digital voltage average value by converting the estimation voltage signal into a digital signal, generate a voltage average by converting the calculated digital voltage average value into an analog signal, and generate a voltage average error by amplifying a difference between the voltage average and a predetermined second reference voltage, and turn the power switch off when a current flowing through the power switch reaches at least one of the current average error and the voltage average error.

The primary side regulator may calculate a digital current average value by converting the estimation current signal into a digital signal, generate a current average by converting the calculated digital current average value into an analog signal, and generate a current average error by amplifying a difference between the current average and a predetermined first reference voltage, generate a voltage average error by amplifying a difference between the estimation voltage signal and a predetermined second reference voltage, and turn the power switch off when a current flowing through the power switch reaches at least one of the current average error and the voltage average error.

The primary side regulator may generate a current average error by amplifying a difference between the estimation current signal and a predetermined first reference voltage, calculate a digital voltage average value by converting the estimation voltage signal into a digital signal, generate a voltage average calculated by converting the calculated digital voltage average value into an analog signal, and generate a voltage average error by amplifying a difference between the voltage average and a predetermined second reference voltage, and turn the power switch off when a current flowing through the power switch reaches at least one of the current average error and the voltage average error.

The primary side regulator in which estimation accuracy of the output voltage and the output current is improved may be provided.

BRIEF DESCRIPTION OF THE DRAWINGS

The above and other objects, features and advantages of the invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
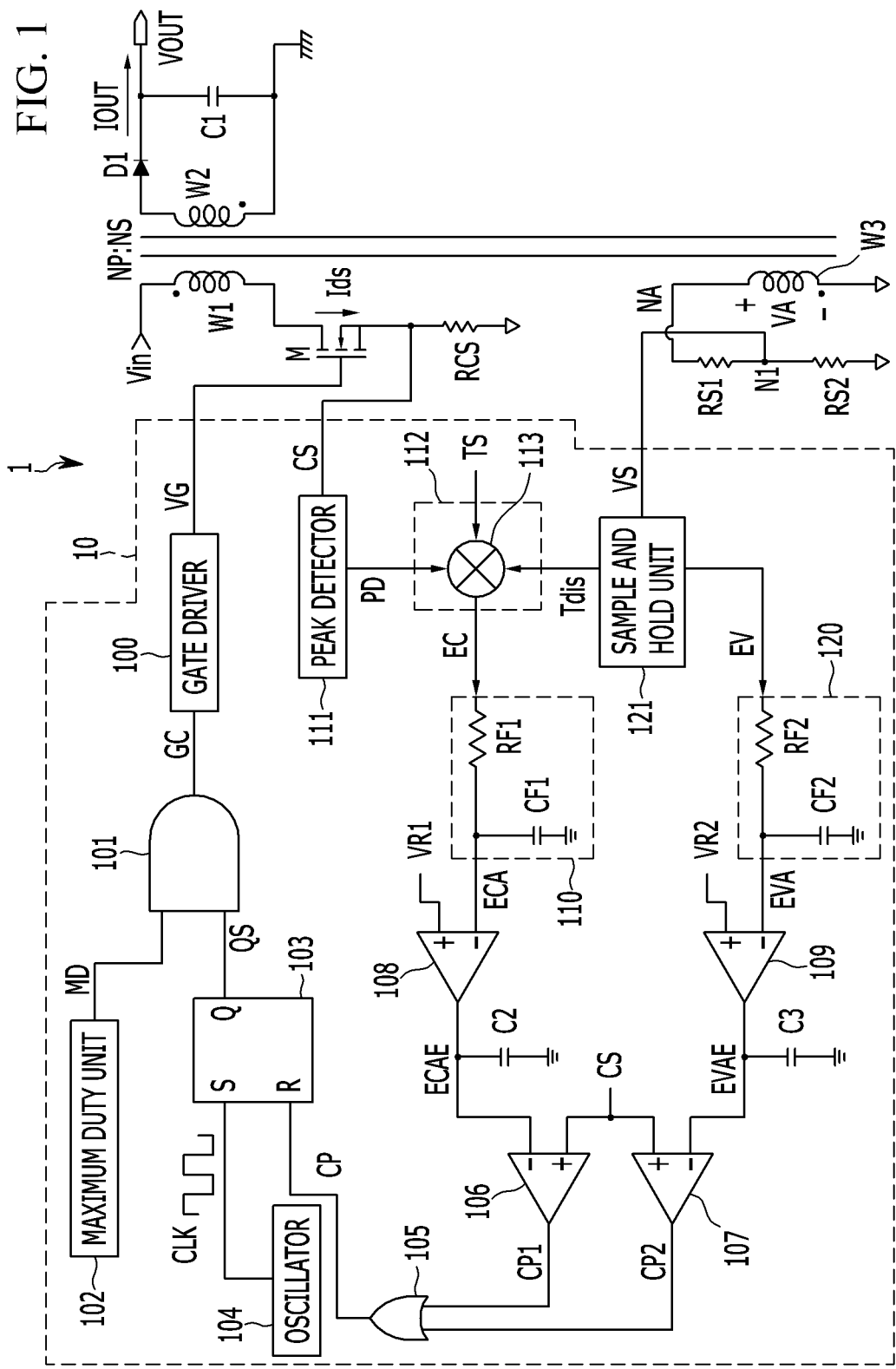
FIG. 1 is a diagram illustrating a primary side regulator according to one exemplary embodiment of the invention.

The invention will be described more fully hereinafter with reference to the accompanying drawings, in which exemplary embodiments of the invention are shown. Exemplary embodiments of the invention are described below in sufficient detail to enable those of ordinary skill in the art to embody and practice the invention. This invention may, however, be embodied in different forms and should not be construed as limited to the embodiments set forth herein. In the descriptions of the invention, known configurations that are not related to the gist of the invention may be omitted. With the addition of reference numerals in components of each drawing, like numerals refer to like components.

Throughout the specification, it will be understood that when an element is referred to as being "connected" or "coupled" to another element, it can be "directly" connected or coupled to the other element or "electrically" connected or coupled via intervening elements which may be present. Further, it will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

FIG. 1 is a diagram illustrating a primary side regulator according to one exemplary embodiment of the invention.

A primary side regulator 1 may be implemented by a flyback converter, although this is an example for describing an exemplary embodiment of the invention, and the invention is not limited thereto.

The primary side regulator 1 may generate an output voltage VOUT and an output current IOUT using a line input voltage Vin in which an alternating current (AC) input is rectified. Hereinafter, the line input voltage Vin may be referred to as an input voltage VIN.

A power switch M may perform a switching operation in response to a gate voltage VG output from a switch control circuit 10. Since the power switch M is an n-channel transistor, an enable level of the gate voltage VG may be a "high" level and a disable level of the gate voltage VG may be a "low" level.

The input voltage Vin may be provided to one end of a primary winding W1, and the other end of the primary winding W1 may be connected to a drain of the power switch M. During a "turn-on" period of the power switch M, a current flowing through the primary winding W1 may be increased to have a gradient according to the input voltage Vin. During the "turn-on" period of the power switch M, energy may be stored in the primary winding W1. When the power switch M is turned "off", a diode D1 may be turned "on", and a current may flow through a secondary winding W2.

A sensing resistor RCS may be connected between a source of the power switch M and a primary ground. A drain-source current Ids flowing through the power switch M may flow through the sensing resistor RCS. A voltage which is sensed by the sensing resistor RCS may be referred to as a first sensing voltage CS.

The secondary winding W2 may be insulated and coupled to the primary winding W1, a turn ratio n between the primary winding W1 and the secondary winding W2 may be the number of turns NS of the secondary winding W2/the number of turns NP of the primary winding W1. One end of the secondary winding W2 may be connected to a diode D1, and the other end of the secondary winding W2 may be connected to a secondary ground.

The diode D1 may be connected between the secondary winding W2 and an output terminal. A cathode of the diode D1 may be connected to the output terminal and an output capacitor C1.

The output capacitor C1 may be connected between the output terminal and the secondary ground, and decrease a ripple of the output current IOUT and a ripple of the output voltage VOUT. The output capacitor C1 may be charged by a current passing through the diode D1.

An auxiliary winding W3 may be coupled to the primary winding W1 at the primary ground, and be insulated and coupled to the secondary winding W2. A turn ratio n1 between the number of turns NA of the auxiliary winding W3 and the number of turns NP of the primary winding W1 may be NA/NP.

The secondary winding W2 may be connected to the output voltage VOUT through the diode D1, and a turn ratio n2 between the number of turns NS of the secondary winding W2 and the number of turns NA of the auxiliary winding W3 may be NA/NS.

Two resistors RS1 and RS2 may be serially connected between the auxiliary winding W3 and the primary ground, and a voltage of a node N1 to which the two resistors RS1 and RS2 are connected may be referred to as a second sensing voltage VS.

When the power switch M is "on", a voltage of the primary winding W1 may be the input voltage Vin, a negative voltage (−n1×Vin) obtained by multiplying the input voltage Vin by the turn ratio n1 may be generated as a voltage (hereinafter, an auxiliary voltage) VA of the auxiliary winding W3.

When the power switch M is "off", a voltage of the secondary winding W2 may be a voltage obtained by adding the output voltage VOUT and a forward voltage VF of the diode D1. The auxiliary voltage VA may be a positive voltage ((VOUT+VF)×n2) obtained by multiplying a voltage of the secondary winding W2 by the turn ratio n2. The forward voltage VF may be a very low voltage compared to the output voltage VOUT, and the auxiliary voltage VA may be substantially (VOUT×n2). Accordingly, the second sensing voltage VS may be (VOUT×n2×RS1/(RS1+RS2)).

The switch control circuit 10 may generate the gate voltage VG according to the first sensing voltage CS and the second sensing voltage VS.

A gate driver 100 may generate the gate voltage VG according to a gate control signal GC. For example, the gate driver 100 may generate the gate voltage VG of the "high" level according to the gate control signal GC of the "high" level, and the gate voltage VG of the "low" level according to the gate control signal GC of the "low" level.

An AND gate 101 may perform a logical AND operation on a maximum duty signal MD and a switching signal QS and generate the gate control signal GC. When the maximum duty signal MD and a switching signal QS are "high" levels, the AND gate 101 may generate the gate control signal GC of the "high" level.

When the "turn-on" period of the power switch M reaches a predetermined threshold period, a maximum duty unit 102 may output a maximum duty signal MD for turning the power switch M off. For example, when the "turn-on" period of the power switch M reaches the predetermined threshold period, the maximum duty unit 102 may output the maximum duty signal MD of the "low" level.

An SR latch 103 may generate the switching signal QS according to a comparison signal CP and a clock signal CLK. The SR latch 103 may output the switching signal QS of the "high" level in synchronization with a rising edge of the clock signal CLK input to a set terminal S. The SR latch 103 may output the switching signal QS of the "low" level in synchronization with a rising edge of the comparison signal CP input to a reset terminal R.

An oscillator 104 may generate the clock signal CLK for determining a switching frequency.

An OR gate 105 may perform a logical OR operation on a first comparison signal CP1 and a second comparison signal CP2 and generate the comparison signal CP. When at least one of the first comparison signal CP1 and the second comparison signal CP2 is the "high" level, the OR gate 105 may generate the comparison signal CP of the "high" level.

A first comparator 106 may generate the first comparison signal CP1 according to a result obtained by comparing the first sensing voltage CS and a current average error ECAE. For example, the current average error ECAE may be input to an inverting terminal (−) of the first comparator 106 and the first sensing voltage CS1 may be input to a non-inverting terminal (+) of the first comparator 106, and when an input of the non-inverting terminal (+) of the first comparator 106 is equal to or more than an input of the inverting terminal (−) of the first comparator 106, the first comparator 106 may output the first comparison signal CP1 of the "high" level, or otherwise, the first comparator 106 may output the first comparison signal CP1 of the "low" level.

A second comparator 107 may generate the second comparison signal CP2 according to a result obtained by comparing the first sensing voltage CS and a voltage average error EVAE. For example, the voltage average error EVAE may be input to an inverting terminal (−) of the second comparator 107 and the first sensing voltage CS1 may be input to a non-inverting terminal (+) of the second comparator 107, and when an input of the non-inverting terminal (+) of the second comparator 107 is equal to or more than an input of the inverting terminal (−) of the second comparator 107, the second comparator 107 may output the second comparison signal CP2 of the "high" level, or otherwise, the second comparator 107 may output the second comparison signal CP2 of the "low" level.

A first error amplifier 108 may amplify a difference between a first reference voltage VR1 and a current average ECA, and generate the current average error ECAE. A capacitor C2 may be connected to an output terminal of the first error amplifier 108, and filter a noise of the current average error ECAE. The first reference voltage VR1 may be input to a non-inverting terminal (+) of the first error amplifier 108, and the current average ECA may be input to an inverting terminal (−) of the first error amplifier 108. The first error amplifier 108 may amplify a result obtained by subtracting an input of the inverting terminal (−) from an input of the non-inverting terminal (+) using a predetermined gain, and generate the current average error ECAE.

A second error amplifier 109 may amplify a difference between a second reference voltage VR2 and a voltage average EVA, and generate the voltage average error EVAE. A capacitor C3 may be connected to an output terminal of the second error amplifier 109, and filter a noise of the voltage average error EVAE. The second reference voltage VR2 may be input to a non-inverting terminal (+) of the second error amplifier 109, and the voltage average EVA may be input to an inverting terminal (−) of the second error amplifier 109. The second error amplifier 109 may amplify a result obtained by subtracting an input of the inverting terminal (−) from an input of the non-inverting terminal (+) using a predetermined gain, and generate the voltage average error EVAE.

Hereinafter, a construction for generating the current average ECA and the voltage average EVA will be described.

First, a peak detector 111 may detect a peak of the first sensing voltage CS for each switching period of the power switch M. The detected peak voltage PD may be transferred to a current calculator 112.

A sample and hold unit 121 may detect a "turn-on" period of the diode D1 using the second sensing voltage VS for each switching period of the power switch M, and sample an estimation voltage signal EV corresponding to the output voltage VOUT.

For example, after the power switch M is turned "off" and a current starts to flow through the diode D1, a resonance may occur in the secondary winding W2 starting from a time at which the current does not flow through the diode D1.

The "turn-on" period may be a period during which the current flows through the diode D1, and may be detected using the second sensing voltage VS. The auxiliary voltage VA may abruptly increase at a time at which the diode D1 is turned "on", and abruptly decrease at a time at which the resonance is started. Accordingly, the sample and hold unit 121 may detect the "turn-on" period by detecting a rising edge and a falling edge of the second sensing voltage VS, and generate an "on" signal Tdis.

In addition, the estimation voltage signal EV corresponding to the output voltage VOUT may be a voltage in which the second sensing voltage VS corresponding to the output voltage VOUT of a time point at which the resonance is started is sampled. That is, when the falling edge of the second sensing voltage VS is detected, the sample and hold unit 121 may output a sampled voltage as the estimation voltage signal EV.

The sample and hold unit 121 may generate the "on" signal Tdis indicating the detected "turn-on" period, and transfer the "on" signal Tdis to the current calculator 112. The "on" signal Tdis may be a signal having the "high" level which has an enable level during the "turn-on" period.

The current calculator 112 may output an estimation current signal EC using the peak voltage PD, a switching period TS, and the "on" signal Tdis. The current calculator 112 may include a multiplier 113, and the multiplier 113 may multiply the peak voltage PD, the switching period TS, and the "on" signal Tdis and generate the estimation current signal EC. The switching period TS may be a switching period of the power switch M.

A first filter 110 may be a low pass filter implemented by a resistor RF1 and a capacitor CF1. A second filter 120 may be a low pass filter implemented by a resistor RF2 and a capacitor CF2, although embodiments are not limited thereto.

The first filter 110 may perform a low pass filtering operation on the estimation current signal EC indicating an estimated output current to remove a ripple. The second filter 120 may perform a low pass filtering operation on the estimation voltage signal EV indicating an estimated output voltage to remove the ripple.

In the first filter 110, the estimation current signal EC may be connected to one end of the resistor RF1, and the capacitor CF1 may be connected between the other end of the resistor RF1 and the primary ground. A voltage of a node to which the capacitor CF1 and the resistor RF1 are connected may be a result obtained by performing the low pass filtering operation on the estimation current signal EC, and the result may be the current average ECA.

In the second filter 120, the estimation voltage signal EV may be connected to one end of the resistor RF2, and the capacitor CF2 may be connected between the other end of the resistor RF2 and the primary ground. A voltage of a node to which the capacitor CF2 and the resistor RF2 are connected may be a result obtained by performing the low pass filtering operation on the estimation voltage signal EV, and the result may be the voltage average EVA.

When the first sensing voltage CS reaches at least one of the current average error ECAE and the voltage average error EVAE, at least one of the first and second comparison signals CP1 and CP2 may be the "high" level, and thus the comparison signal CP may be the "high" level. The SR latch 103 may output the switching signal QS of the "low" level in synchronization with a rising edge of the comparison signal CP. Therefore, the gate control signal GC may be the "low" level, and the gate driver 100 may generate the gate voltage VG of the "low" level. Accordingly, the power switch M may be turned "off".

After that, the SR latch 103 may output the switching signal QS of the "high" level at a time of a rising edge of the clock signal CLK. Therefore, the gate control signal GC may be the "high" level, and the gate driver 100 may generate the gate voltage VG of the "high" level. Accordingly, the power switch M may be turned "on".

As the embodiment, in the primary side regulator, when the current ripple that can be included in the estimated diode current and the voltage ripple that can be included in the estimated output voltage are removed, the power factor may be increased, and a kick-in and kick-out phenomenon may be prevented.

Both the current average ECA and the voltage average EVA may be generated by performing the low pass filtering operation on both of the estimation voltage signal EV and the estimation current signal EC. However, embodiments may not be limited thereto.

When the ripple of the estimated output voltage is not large, another embodiment may be applied to the primary side regulator. For example, only the current average ECA may be generated by performing the low pass filtering operation on only the estimation current signal EC.

Figure 2:
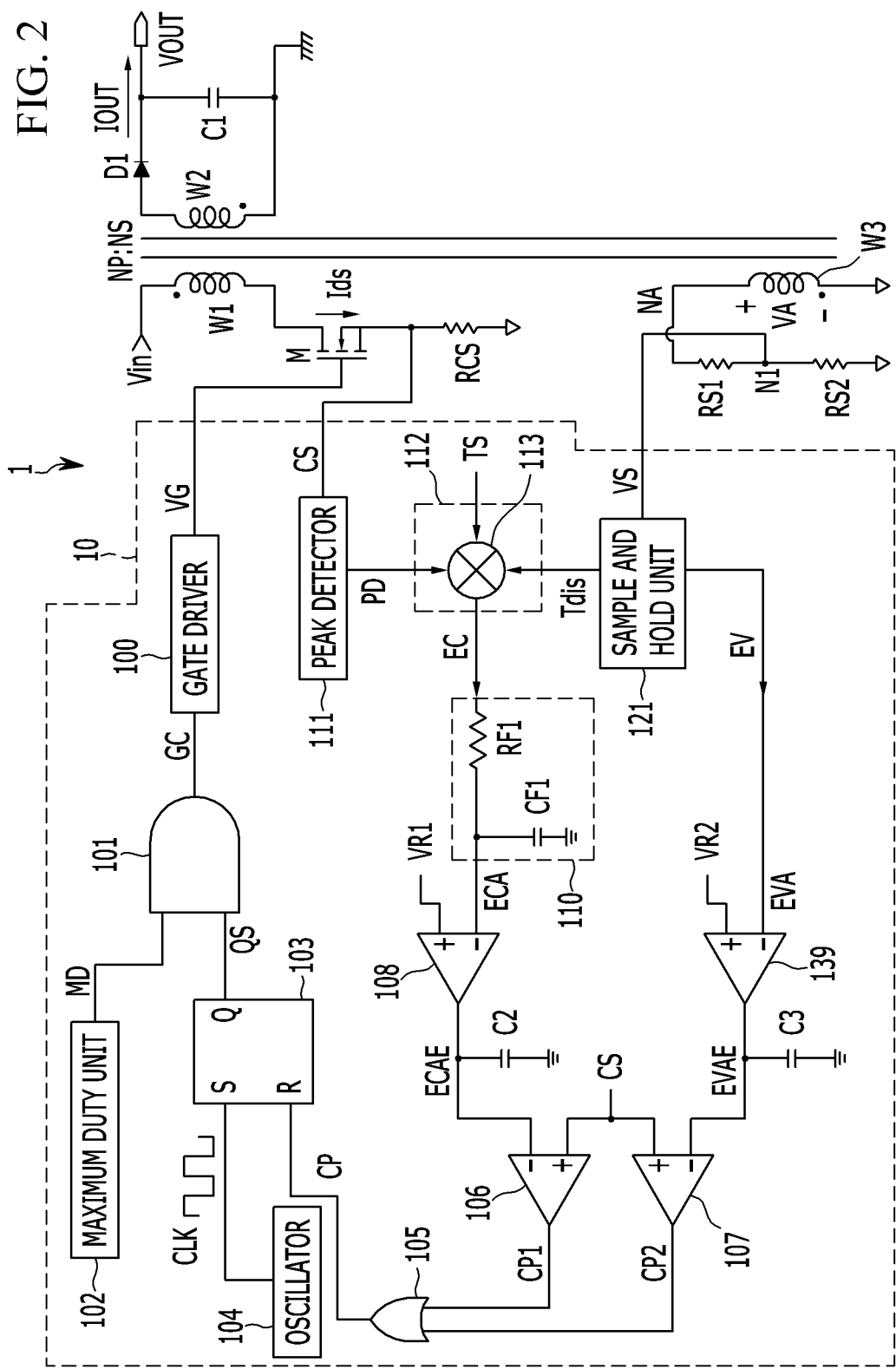
FIG. 2 is a diagram illustrating a primary side regulator according to another exemplary embodiment of the invention.

FIG. 2 is a diagram illustrating a primary side regulator according to another exemplary embodiment of the invention.

The same reference numerals may be used with respect to the same components as the embodiment of FIG. 1, and duplicated descriptions will be omitted.

A second error amplifier 139 may amplify a difference between the second reference voltage VR2 and the estimation voltage signal EV, and generate the voltage average error EVAE. A capacitor C3 may be connected to an output terminal of the second error amplifier 139, and filter a noise of the voltage average error EVAE. The second reference voltage VR2 may be input to a non-inverting terminal (+) of the second error amplifier 139, and the estimation voltage signal EV may be input to an inverting terminal (−) of the second error amplifier 139. The second error amplifier 139 may generate the voltage average error EVAE by amplifying a result obtained by subtracting an input of the inverting terminal (−) from an input of the non-inverting terminal (+) using a predetermined gain.

In addition, when a ripple of the estimated output current is not large, another embodiment may be applied to the primary side regulator. For example, only the voltage average EVA may be generated by performing a low pass filtering operation on only the estimation voltage signal EV.

Figure 3:
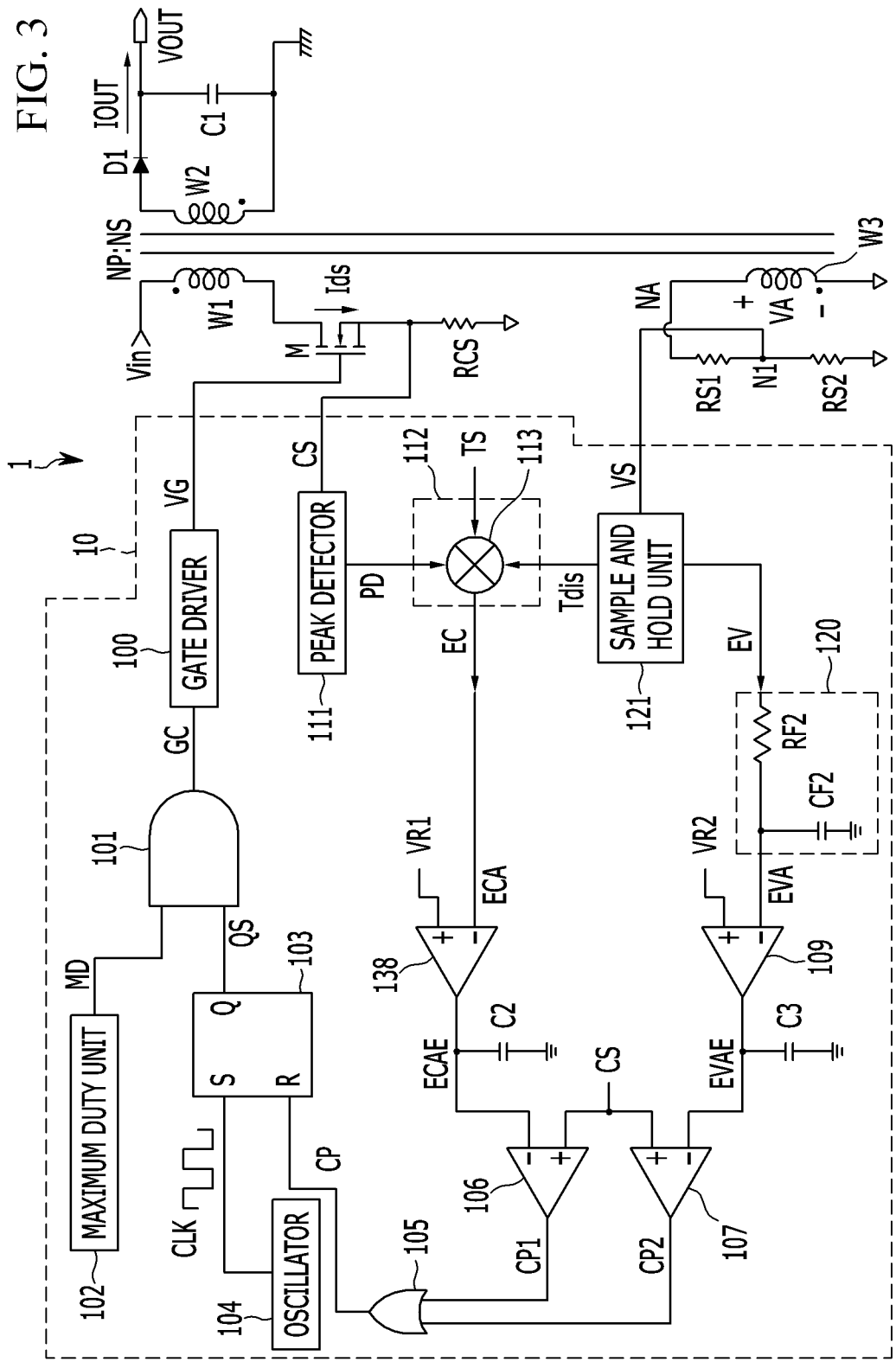
FIG. 3 is a diagram illustrating a primary side regulator according to still another exemplary embodiment of the invention.

FIG. 3 is a diagram illustrating a primary side regulator according to still another exemplary embodiment of the invention.

The same reference numerals may be used with respect to the same components as the embodiment of FIG. 1, and duplicated descriptions will be omitted.

A first error amplifier 138 may amplify a difference between the first reference voltage VR1 and the estimation current signal EC, and generate the current average error ECAE. A capacitor C2 may be connected to an output terminal of the first error amplifier 138, and filter a noise of the current average error ECAE. The first reference voltage VR1 may be input to a non-inverting terminal (+) of the first error amplifier 138, and the estimation current signal EC may be input to an inverting terminal (−) of the first error amplifier 138. The first error amplifier 138 may generate the current average error ECAE by amplifying a result obtained by subtracting an input of the inverting terminal (−) from an input of the non-inverting terminal (+) using a predetermined gain.

In embodiments described so far, a low pass filter implemented as an analog circuit may be used as an example of a filter. However, embodiments may not be limited thereto.

Hereinbefore, in the embodiments shown in FIGS. 1 to 3, the first filter 110 and second filter 120 may be replaced by a digital filter.

Figure 4:
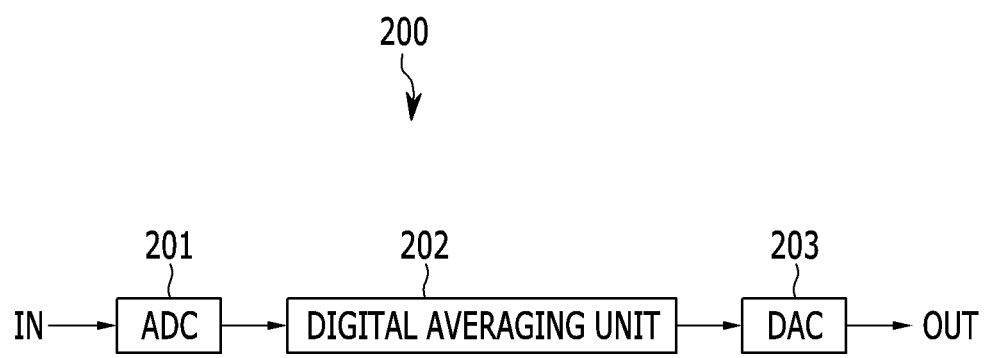
FIG. 4 is a diagram illustrating a digital filter according to an exemplary embodiment of the invention.

FIG. 4 is a diagram illustrating a digital filter according to an exemplary embodiment of the invention.

As shown in FIG. 4, a digital filter 200 may include an analog-to-digital converter (ADC) 201, a digital averaging unit 202, and a digital-to-analog converter (DAC) 203.

The ADC 201 may convert an input analog signal IN into a digital signal. The analog signal IN may be at least one of the estimation current signal EC and the estimation voltage signal EV.

The digital averaging unit 202 may average digital signals which are sequentially input, and generate average value. Since the estimation voltage signal EV and the estimation current signal EC are changed for each switching period, the digital signals may be changed for each switching period. Accordingly, the digital averaging unit 202 may calculate the average value of the digital signals changed for each switching period.

The DAC 203 may convert the average value which is an output of the digital averaging unit 202 into an analog signal OUT, and output the converted average value. The analog signal OUT may be at least one of the current average ECA and the voltage average EVA.

Although the exemplary embodiments of the invention are described above in detail, the spirit or scope of the invention is not limited thereto. All various modifications by those of ordinary skill in the art using the spirit or scope of the invention of the appended claims and equivalents may belong to the scope of the right of the invention.

What is claimed is:

1. A primary side regulator, comprising:
a power switch connected to a primary winding;
a secondary winding;
a diode connected between the secondary winding and an output terminal; and
an auxiliary winding coupled to the primary winding,
wherein the primary side regulator controls a switching operation of the power switch by comparing one of a voltage average error based on an estimation voltage signal corresponding to an output voltage of the output terminal and a current average error based on an estimation current signal corresponding to an output current flowing through the diode with a current flowing through the power switch, and
wherein the primary side regulator filters at least one of the estimation voltage signal and the estimation current signal.

2. The primary side regulator of claim 1, further comprising:
a peak detector configured to detect a peak voltage of a first sensing voltage according to the current flowing through the power switch for each switching period of the power switch; and
a current calculator configured to generate the estimation current signal by multiplying the peak voltage, the switching period of the power switch and an on signal corresponding to a turn-on period of the diode.

3. The primary side regulator of claim 1, further comprising:

a sample and hold unit configured to sample and hold a second sensing voltage according to an auxiliary voltage of the auxiliary winding at a time at which a current does not flow through the diode after the power switch is turned off, and generate the estimation voltage signal.

4. The primary side regulator of claim 1, further comprising:
a first filter configured to perform a low pass filtering operation on the estimation current signal, and generate a current average.

5. The primary side regulator of claim 4, further comprising:
a first error amplifier configured to amplify a difference between the current average and a predetermined first reference voltage, and generate the current average error.

6. The primary side regulator of claim 1, further comprising:
a digital filter configured to convert the estimation current signal into a digital signal, calculate an average value of the digital signal, convert the calculated average value into an analog signal, and generate a current average.

7. The primary side regulator of claim 6, further comprising:
a first error amplifier configured to amplify a difference between the current average and a predetermined first reference voltage, and generate the current average error.

8. The primary side regulator of claim 1, further comprising:
a second filter configured to perform a low pass filtering operation on the estimation voltage signal, and generate a voltage average.

9. The primary side regulator of claim 8, further comprising:
a second error amplifier configured to amplify a difference between the voltage average and a predetermined second reference voltage, and generate the voltage average error.

10. The primary side regulator of claim 1, further comprising:
a digital filter configured to convert the estimation voltage signal into a digital signal, calculate an average value of the digital signal, convert the calculated average value into an analog signal, and generate a voltage average.

11. The primary side regulator of claim 10, further comprising:
a second error amplifier configured to amplify a difference between the voltage average and a predetermined second reference voltage, and generate the voltage average error.

12. The primary side regulator of claim 1, wherein the primary side regulator is configured to:
generate a current average by performing a low pass filtering operation on the estimation current signal;
generate the current average error by amplifying a difference between the current average and a predetermined first reference voltage;
generate a voltage average by performing a low pass filtering operation on the estimation voltage signal;
generate the voltage average error by amplifying a difference between the voltage average and a predetermined second reference voltage; and
turn the power switch off when a current flowing through the power switch reaches at least one of the current average error and the voltage average error.

13. The primary side regulator of claim 1, wherein the primary side regulator is configured to:
- generate a current average by performing a low pass filtering operation on the estimation current signal;
- generate the current average error by amplifying a difference between the current average and a predetermined first reference voltage;
- generate the voltage average error by amplifying a difference between the estimation voltage signal and a predetermined second reference voltage; and
- turn the power switch off when a current flowing through the power switch reaches at least one of the current average error and the voltage average error.

14. The primary side regulator of claim 1, wherein the primary side regulator is configured to:
- generate the current average error by amplifying a difference between the estimation current signal and a predetermined first reference voltage;
- generate a voltage average by performing a low pass filtering operation on the estimation voltage signal;
- generate the voltage average error by amplifying a difference between the voltage average and a predetermined second reference voltage; and
- turn the power switch off when a current flowing through the power switch reaches at least one of the current average error and the voltage average error.

15. The primary side regulator of claim 1, wherein the primary side regulator is configured to:
- calculate a digital current average value by converting the estimation current signal into a digital signal;
- generate a current average by converting the calculated digital current average value into an analog signal;
- generate the current average error by amplifying a difference between the current average and a predetermined first reference voltage;
- calculate a digital voltage average value by converting the estimation voltage signal into a digital signal;
- generate a voltage average by converting the calculated digital voltage average value into an analog signal;
- generate the voltage average error by amplifying a difference between the voltage average and a predetermined second reference voltage; and
- turns the power switch off when a current flowing through the power switch reaches at least one of the current average error and the voltage average error.

16. The primary side regulator of claim 1, wherein the primary side regulator is configured to:
- calculate a digital current average value by converting the estimation current signal into a digital signal;
- generate a current average by converting the calculated digital current average value into an analog signal;
- generate the current average error by amplifying a difference between the current average and a predetermined first reference voltage;
- generate the voltage average error by amplifying a difference between the estimation voltage signal and a predetermined second reference voltage; and
- turn the power switch off when a current flowing through the power switch reaches at least one of the current average error and the voltage average error.

17. The primary side regulator of claim 1, wherein the primary side regulator is configured to:
- generate the current average error by amplifying a difference between the estimation current signal and a predetermined first reference voltage;
- calculate a digital voltage average value by converting the estimation voltage signal into a digital signal;
- generate a voltage average by converting the calculated digital voltage average value into an analog signal;
- generate the voltage average error by amplifying a difference between the voltage average and a predetermined second reference voltage; and
- turn the power switch off when a current flowing through the power switch reaches at least one of the current average error and the voltage average error.

18. A primary side regulator, comprising:
- a power switch connected to a primary winding;
- a secondary winding;
- a diode connected between the secondary winding and an output terminal; and
- an auxiliary winding coupled to the primary winding,
- wherein the primary side regulator controls a switching operation of the power switch using a current average obtained by filtering an estimation current signal corresponding to an output current flowing through the diode.

19. The primary side regulator of claim 18, further comprising:
- a peak detector configured to detect a peak voltage of a first sensing voltage according to a current flowing through the power switch for each switching period of the power switch; and
- a current calculator configured to generate the estimation current signal by using the peak voltage, the switching period of the power switch and an on signal corresponding to a turn-on period of the diode.

20. A primary side regulator, comprising:
- a power switch connected to a primary winding;
- a secondary winding;
- a diode connected between the secondary winding and an output terminal;
- an auxiliary winding coupled to the primary winding; and
- a sample and hold unit configured to sample and hold a second sensing voltage according to an auxiliary voltage of the auxiliary winding at a time at which a current does not flow through the diode after the power switch is turned off,
- wherein the primary side regulator controls a switching operation of the power switch using a voltage average obtained by filtering an output of the sample and hold unit.

* * * * *